UNITED STATES PATENT OFFICE.

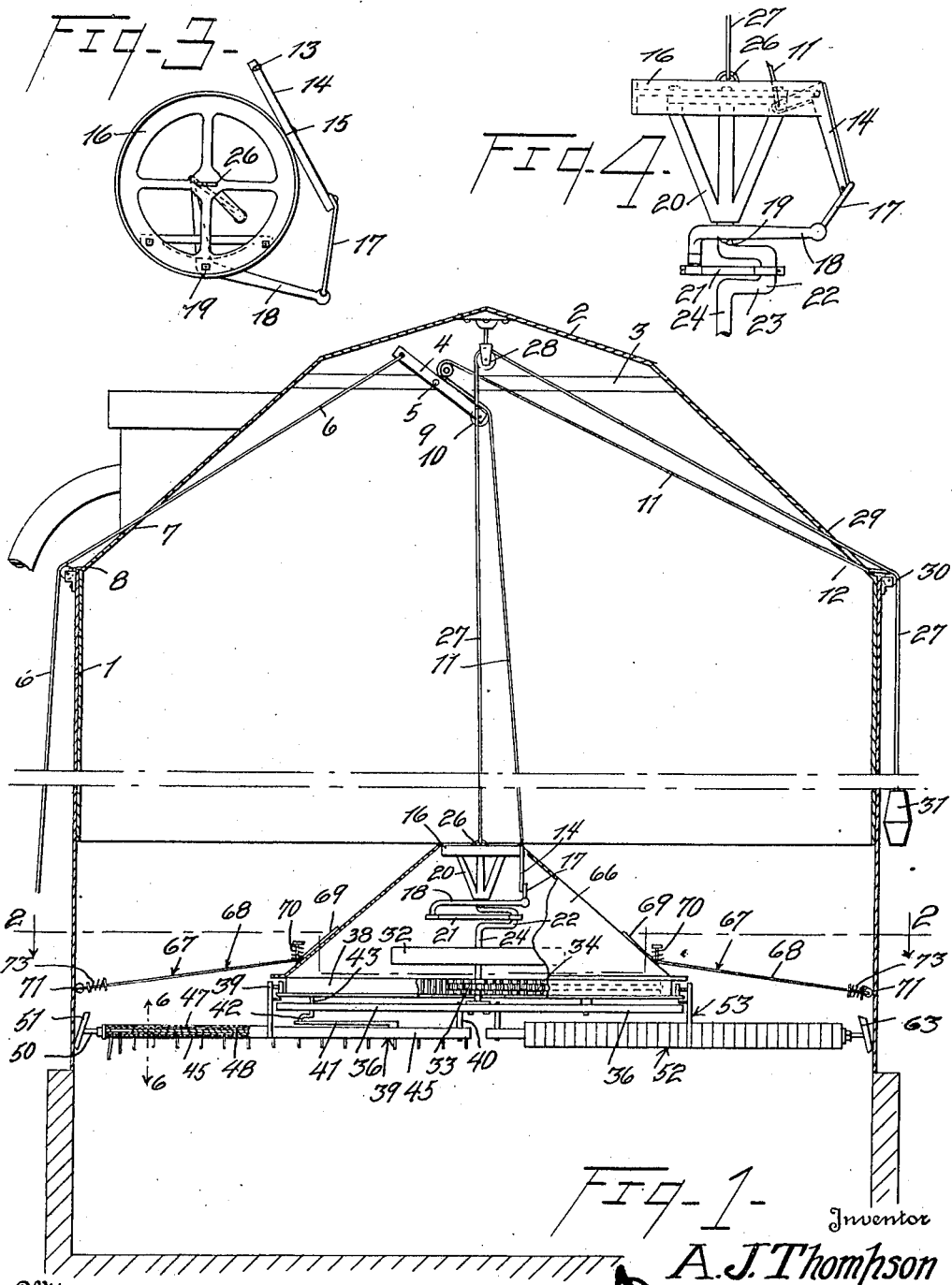

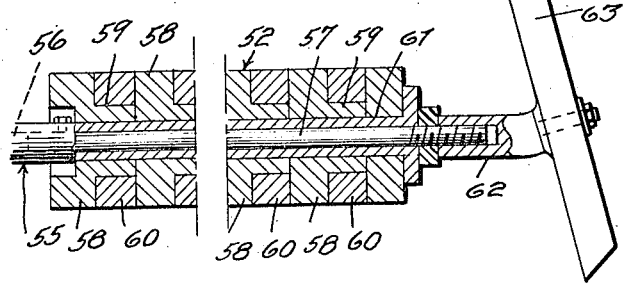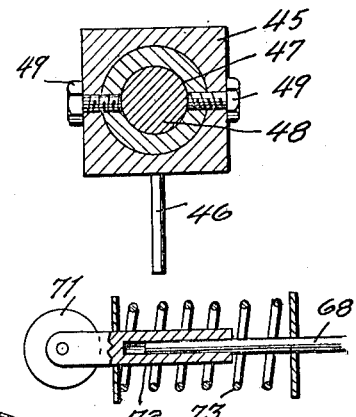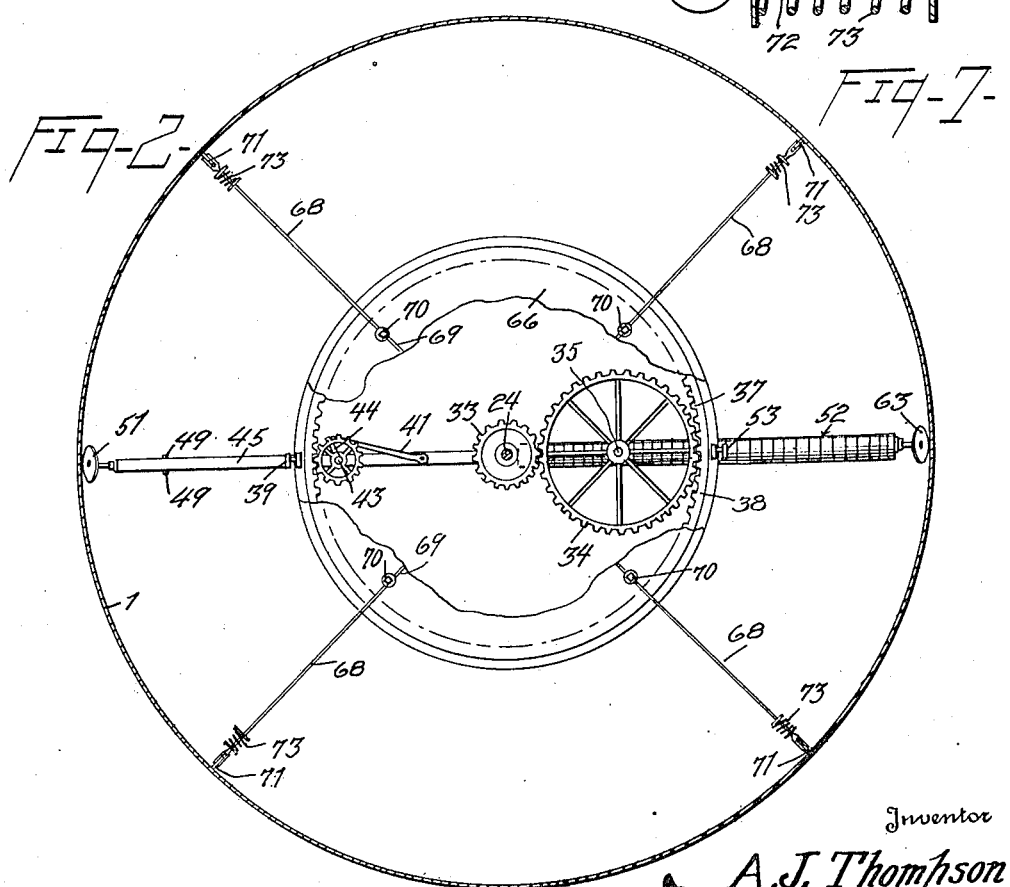

ARTHUR J. THOMPSON, OF MASON, MICHIGAN.

SILAGE-PACKER.

1,261,651.  Specification of Letters Patent.  Patented Apr. 2, 1918.

Application filed July 18, 1917. Serial No. 181,293.

*To all whom it may concern:*

Be it known that I, ARTHUR J. THOMPSON, a citizen of the United States, residing at Mason, in the county of Ingham and State of Michigan, have invented certain new and useful Improvements in Silage-Packers; and I do hereby declare the following to be a full, clear, and exact description of the invention, such as will enable others skilled in the art to which it appertains to make and use the same.

This invention relates to a packer for packing silage in a silo and the primary object of the invention is to provide a packer structure including a rotary member to which is connected a rake structure and a packing or tamping roller structure, each of which is adjustable as to length to accommodate different size silos, whereby the silage will first be raked level within the silo and be tamped by the tamping or packing roller.

A further object of this invention is to provide means for administering an oscillatory movement to the rake structure for assisting in properly leveling the silage.

A still further object of this invention is to provide a silage packer as specified which includes a crank shaft having a gear connected therewith which gear is connected, through the medium of a second gear, to the rake and roller carrying member, and to provide a novel means including a pivotally mounted lever, a pair of cables, and a pair of pivotally connected arms which are connected to the crank shaft for rotating the crank shaft and the rotary rake and packing roller carrying member.

With the foregoing and other objects in view, this invention consists in such novel features of construction, combination and arrangement of parts as will be hereinafter more fully described, illustrated in the accompanying drawings and claimed.

In describing the invention in detail, reference will be had to the accompanying drawings wherein like characters designate like and corresponding parts throughout the several views, and in which—

Figure 1 is a vertical section through a silo, showing the improved silage packer positioned therein and illustrating part of the packer in section.

Fig. 2 is a section on the line 2—2 of Fig. 1,

Fig. 3 is a detail plan of a part of the packer rotating means,

Fig. 4 is a side elevation of the structure illustrated in Fig. 3,

Fig. 5 is a sectional view through the packing roller,

Fig. 6 is a section on the line 6—6 of Fig. 1 showing the rake structure in section, and Fig. 7 is a detail view partially in section of one of the spacing rollers of the packer.

Referring more particularly to the drawings, 1 designates the walls of an ordinary silo, and 2 the roof of the silo, which is braced by a suitable bracing structure. The bracing structure 3 has a lever 4 pivotally connected thereto as shown at 5, to one end of which lever a cable 6 is connected. The cable 6 passes outwardly through an opening 7 formed in the top 2 of the silo, over a guiding pulley 8, and may be connected to any suitable operating structure for pivotally moving or rocking the lever 4. The lever 4 has a pulley 9 rotatably carried thereby intermediate of its ends and a second pulley 10 rotatably carried at its lowermost end. A cable 11 extends through the roof 2 as shown at 12 and it passes over the pulleys 9 and 10 and downwardly, having its lower end connected to the end 13 of a lever 14 while its end which extends out of the roof is connected to a weight 31. The lever 14 is pivotally connected as shown at 15 to a circular member 16 and it is angled, as clearly shown in Fig. 4, having its lowermost end connected to a rod or bar 17 which is in turn connected to a second angled lever 18. The angled lever 18 is pivotally connected as shown at 19 to the supporting structure or braces 20 of the circular member 16 and it has a pitman 21 connected thereto which is connected to the wrist 22 of a crank 23 formed upon a shaft 24.

The circular member 16 has an eye 26 carried by the center of the same to which eye a cable 27 is connected. The cable 27 passes over a pulley 28 suspended from the peak of the roof of the silo and extends outwardly through an opening 29 formed in the roof. The cable 27 further passes over a pulley 30 supported by the sides of the silo and has a balancing weight 31 carried by its lower end and positioned exteriorly of the silo.

The crank shaft 24 has a balance wheel 32 mounted thereon, and also a gear 33. The gear 33 meshes with a second gear 34 which is rotatably mounted upon a shaft 35. The shaft 35 is supported by a suitable supporting bar 36. The gear 34 meshes with the internal teeth 37 formed upon a ring or circular rim 38.

The rake 39 is connected to the rim 38 by a suitable hanger bracket 39', and it has its inner end connected to the bar 36 by a pin 40, as clearly shown in Fig. 1 of the drawings. An arm 41 is connected to the rake structure 39 and to a crank 42 which is formed upon a vertical shaft 43. A gear 44 is mounted upon the shaft 43 and meshes with the teeth 37 for administering an oscillatory movement to the rake structure 39 during the rotation of the ring 38.

The rake structure 39 is composed of a main body or back bar 45 which has a plurality of teeth 46 attached to its under surface, and the outer portion of which is provided with a recess 47, that telescopically receives a pin 48. The pin 48 is carried by one of the outermost sections of the rake structure, and it is held firmly in adjusted position within the opening 47 by set screws 49. By attaching the outer sections at different lengths to the main body 45 of the rake structure, the lengths of the same may be varied for accommodating silos of different diameters. The outermost bar or section of the rake structure 39 has a shaft 50 carried thereby upon which a roller 51 is mounted. The roller 51 is provided for riding upon the upper surface of the silage, and for engaging the inner surface of the side 1 of the silo.

The packer or tamper structure 52 is supported by the ring 38 through the medium of a suitable bracket 53 and it comprises a main core or body 55 which has a plurality of rollers mounted thereon. The main body 55 of the tamper structure is provided with a central opening 56 which receives a shaft 57, so that the length of the tamper structure may be regulated as found necessary in using the packer with different sized silos. The rollers 58 are provided with hubs 59 which form bearings for the rollers 60, as clearly shown in Fig. 5 of the drawings. The shaft 57 has a sleeve 61 mounted thereon which is of equal diameter to the main shaft or bar 55 so that all of the rollers 58 may have bores of equal diameters. The rod 57 has a sleeve 62 screw threadably mounted thereupon which rotatably supports the roller 63. The roller 63 is identical in construction with the roller 51 and serves the same purpose.

The circular member or ring 38, balance wheel 32, crank shaft and the rest of the main operative parts of the silage packers are inclosed by a metal housing or covering 66 to which a plurality of bracing or spacing arms or rods 67 are adjustably attached so that they may be adjusted with respect to the housing, for accommodating silos of different diameters. The rods 67 are composed of sections 68 and 69, which latter sections are connected to the housing 66.

A spring 70 is provided at the hinged connection of each of the sections of the rods, for holding the sections 68 downwardly, and consequently holding the casters 71 which are carried by the outer ends of the rods 68, in engagement with the inner surface of the walls of the silo. The caster wheels 71 are carried by the sleeves 72 which are adjustably mounted upon the ends of the rods 68, and spiral springs 73 are provided for forcing the caster wheels 71, outwardly and into engagement with the inner surface of the sides of the silo.

In the operation of the improved silage packer; the cable 6 is operated for pivotally moving or rocking the lever 4, and the rocking of the lever 4 will move the cable 11, and rock the pivoted lever or arm 14. The pivotal movement of the lever or arm 14 will be transmitted to the pitman 21 through the medium of the rod 17 and lever 18 and will rotate the shaft 24, which will in turn rotate the gear 33. The rotation of the gear 33 will be transmitted through the gear 34, to the ring 38, and the rotation of the ring 38 will move the rake structure 39 and the tamping roller 52 over the surface of the silage within the silo, first leveling the silage and afterward tamping or packing the same. The balance wheel 32 is provided for facilitating the upward movement of the packer during the filling of the silo.

When it is desired to empty the silo, the packing roller 52 is removed and a second rake structure is attached to the ring or rim 38 in lieu thereof, and the operation of the rake structures will carry the silage about to the door of the silo from whence it can be easily removed.

What is claimed is:—

1. In a silage packer, the combination, of a rotatable rim, a rake structure carried by said rim, means for rotating said rim for moving the rake about the interior of a silo, and means connected to said rim and said rake for oscillating the rake during movement.

2. In a silage packer, a rotatable rim, a rake structure carried by said rim, a tamping roller structure carried by said rim, a lever pivotally supported above said rim, means for rocking said lever, and means operable by the rocking of said lever for rotating said rim for moving said rake and tamping roller within a silo.

3. In a silage packer, a rotatable rim, a rake structure carried by said rim, a tamping roller structure carried by said rim, a lever pivotally supported above said rim, means for rocking said lever, means operable by the rocking of said lever for rotating said rim for moving said rake and tamping roller within a silo, and means connected to said rim and said rake structure for oscillating the rake during rotation of the rim.

4. In a silage packer, the combination, of a rotatable rim having gear teeth formed upon its inner edge, a gear meshing with said teeth, a crank shaft, means for rotatably supporting said crank shaft, a gear carried by said crank shaft, and meshing with said second mentioned gear for rotating said rim upon rotation of the crank shaft, means for rotating the crank shaft, and a rake structure carried by said rim.

5. In a silage packer, the combination, of a rotatable rim having gear teeth formed upon its inner edge, a gear meshing with said teeth, a crank shaft, means for rotatably supporting said crank shaft, a gear carried by said crank shaft, and meshing with said second mentioned gear for rotating said rim upon rotation of the crank shaft, means for rotating the crank shaft, a rake structure carried by said rim, and a tamping roller carried by said rim and extending outwardly substantially in alinement with said rake structure.

6. In a silage packer, the combination, of a rotatable rim having gear teeth formed upon its inner edge, a gear meshing with said teeth, a crank shaft, means for rotatably supporting said crank shaft, a gear carried by said crank shaft, and meshing with said second mentioned gear for rotating said rim upon rotation of the crank shaft, means for rotating the crank shaft, a rake structure carried by said rim, a tamping roller carried by said rim and extending outwardly substantially in alinement with said rake structure, a plurality of guiding arms, and spring controlled caster wheels carried by the outer ends of said guiding arms for engaging the inner surface of the walls of the silo for holding said rim centrally within the silo.

7. In a silage packer, a rim, a rake structure carried by said rim, a tamping roller structure carried by said rim, a crank shaft, means operatively connecting said crank shaft to said rim for rotating the rim upon rotation of the crank shaft, a pitman connected to said crank shaft, a pivotally mounted lever carried by the silo, means connecting said lever to said pitman for rotating the crank shaft upon pivotal movement of the lever, and means for pivotally moving said lever.

8. In a silage packer, a rim, a rake structure carried by said rim, a tamping roller structure carried by said rim, a crank shaft, means operatively connecting said crank shaft to said rim for rotating the rim upon rotation of the crank shaft, a pitman connected to said crank shaft, a pivotally mounted lever carried by the silo, means connecting said lever to said pitman for rotating the crank shaft upon pivotal movement of the lever, means for pivotally moving said lever, and means connected to said rim and said rake structure for oscillating the rake structure during rotation of the rim.

In testimony whereof I affix my signature in presence of two witnesses.

ARTHUR J. THOMPSON.

Witnesses:
 MAUD E. SPITZER,
 PHILLIP L. KLINE.

Copies of this patent may be obtained for five cents each, by addressing the "Commissioner of Patents Washington, D. C."